United States Patent [19]

McCreary

[11] 4,445,337
[45] May 1, 1984

[54] ENGINE WITH SPEED RESPONSIVE MULTI-RATIO TURBOCHARGER DRIVE

[75] Inventor: Charles H. McCreary, Oak Park, Ill.

[73] Assignee: General Motors Corporation, Detroit, Mich.

[21] Appl. No.: 422,545

[22] Filed: Sep. 24, 1982

[51] Int. Cl.³ .............................................. F02B 37/10
[52] U.S. Cl. ........................................ 60/608; 74/664; 74/665 B; 192/48.6
[58] Field of Search ................. 60/607, 608; 123/561; 74/664, 665 B; 192/48.6, 48.92, 20

[56] References Cited

U.S. PATENT DOCUMENTS

| | | | |
|---|---|---|---|
| 2,197,179 | 4/1940 | Hersey | 60/608 |
| 2,518,660 | 8/1950 | Browne | 60/608 X |
| 2,688,256 | 9/1954 | Forster | 192/48.6 X |
| 2,894,498 | 7/1959 | Chaplin et al. | 123/561 |
| 3,667,214 | 6/1972 | Addie | 60/608 |

OTHER PUBLICATIONS

EMD 645E3 Engine Maintenance Manual, Nov. 1965, Section 6, p. 1, Electro-Motive Division, General Motors Corporation, LaGrange, IL.

Primary Examiner—Michael Koczo
Attorney, Agent, or Firm—Robert J. Outland

[57] ABSTRACT

An internal combustion engine, especially of the two stroke cycle diesel type, has a turbocharger with a supplemental mechanical drive for maintaining a minimum speed ratio relative to engine speed, when exhaust energy is insufficient to provide a higher speed, so as to maintain adequate charging air for engine operation throughout the engine speed range. In order to provide more efficient operation during engine operation at idle and in a lower portion of the operating range where a reduced amount of charging air is adequate, a secondary lower speed ratio is provided by the mechanical drive system. A speed responsive clutch is included to disconnect the higher speed primary drive during engine operation in the lower speed range and permit operation at the more efficient secondary speed ratio.

4 Claims, 6 Drawing Figures

ENGINE WITH SPEED RESPONSIVE MULTI-RATIO TURBOCHARGER DRIVE

TECHNICAL FIELD

This invention relates to internal combustion engines especially of the turbocharged two cycle diesel type and more particularly to multi-ratio positive drive means for supplementing the exhaust turbine drive. In more specific embodiments, the invention relates to speed responsive dual ratio mechanical drive systems for railway engine turbochargers and the like.

BACKGROUND

It is known in the art relating to internal combustion engines and in particular to two cycle diesel engines to provide an exhaust driven turbocharger having supplemental means such as a gear drive operative to positively drive the turbocharger at a predetermined minimum speed ratio with respect to engine speed. In this manner, the required minimum air flow is provided for all engine operating conditions wherein exhaust energy provided by the engine exhaust system is insufficient to drive the turbocharger at the required minimum speed.

In many common applications of two cycle diesel engines, such as power for railway locomotives, a mechanical turbocharger drive ratio adequate to provide the required minimum air flow for operation during acceleration and at higher engine speeds and loads is known to provide air flow substantially exceeding that which is required for operating the engine at the lower end of the speed range and at idle. This occurs because substantially lower fuel injection rates are required for operation in the lower ranges of speeds and loads. Thus while adequate engine performance for acceleration and power operation at all engine speeds may be provided by a single speed ratio mechanical drive for a two cycle engine turbocharger, the unnecessarily high air flow provided at idle and low operating speeds and loads requires a greater than necessary amount of energy to drive the turbocharger with resulting adverse effects on fuel economy in the lower speed ranges.

SUMMARY OF THE INVENTION

The present invention provides an improved turbocharger with a dual speed ratio supplemental mechanical drive which improves energy operating efficiency by reducing the turbocharger speed and operating horsepower at engine speeds below a predetermined level where the operating loads are sufficiently low to permit operation with a reduced amount of charging air flow. To provide the two speed turbocharger drive, a dual ratio gear drive system is provided between the engine crankshaft and the turbocharger rotor.

The two speed gear drive includes two parallel trains of gears of differing operating ratios which are continuously engaged. A speed responsive clutch is provided in the drive gear for the high speed train which disengages the drive path through this train in the lower range of engine speeds when operation at the lower speed is desired. An overrunning clutch is provided in the drive gear for the lower speed train to permit overrunning of the gears attached thereto when the speed responsive clutch in the high speed train is engaged so as to permit operation at the higher gear ratio.

The physical embodiment of a two speed mechanical drive supplementing the exhaust turbine drive for an engine turbocharger includes, in a particular embodiment, an arrangement utilizing components of the engine camshaft driving gear train together with a novel arrangement of associated turbocharger drive gears and the required speed responsive and overrunning clutches to provide the required dual speed ratio drive system for an engine turbocharger.

These and other features and advantages of the invention will be more fully understood from the following description of a preferred embodiment of turbocharged two cycle diesel engine having two speed supplemental turbo drive means according to the invention taken together with the accompanying drawings.

BRIEF DRAWING DESCRIPTION

Figure 1:
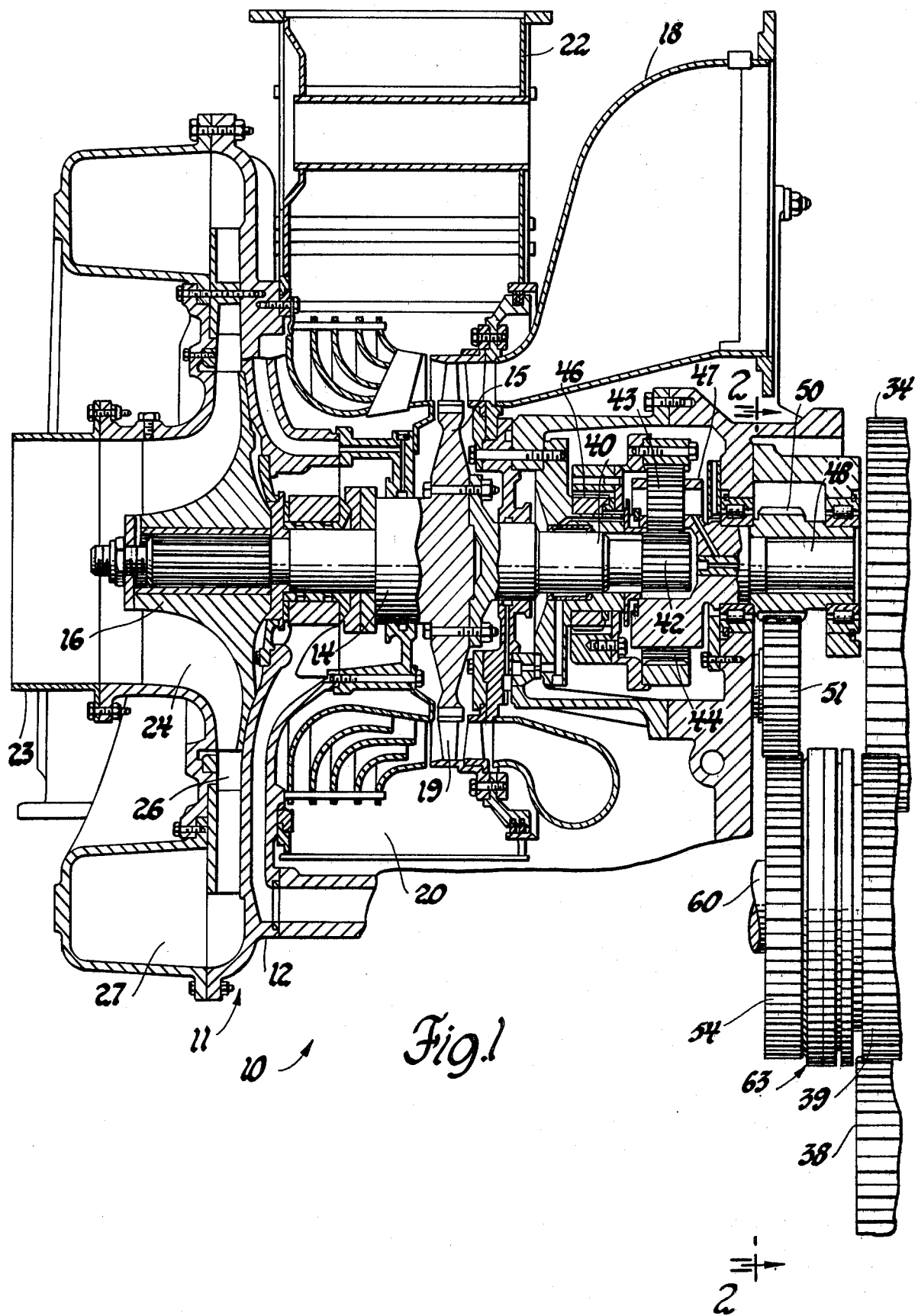
FIG. 1 is a fragmentary cross-sectional view of the rear end of a turbocharged medium speed turbocharged two cycle diesel engine of a type commonly used for various applications such as railway diesel locomotives and showing the turbocharger and associated dual ratio mechanical drive means in accordance with the invention.
Figure 2:
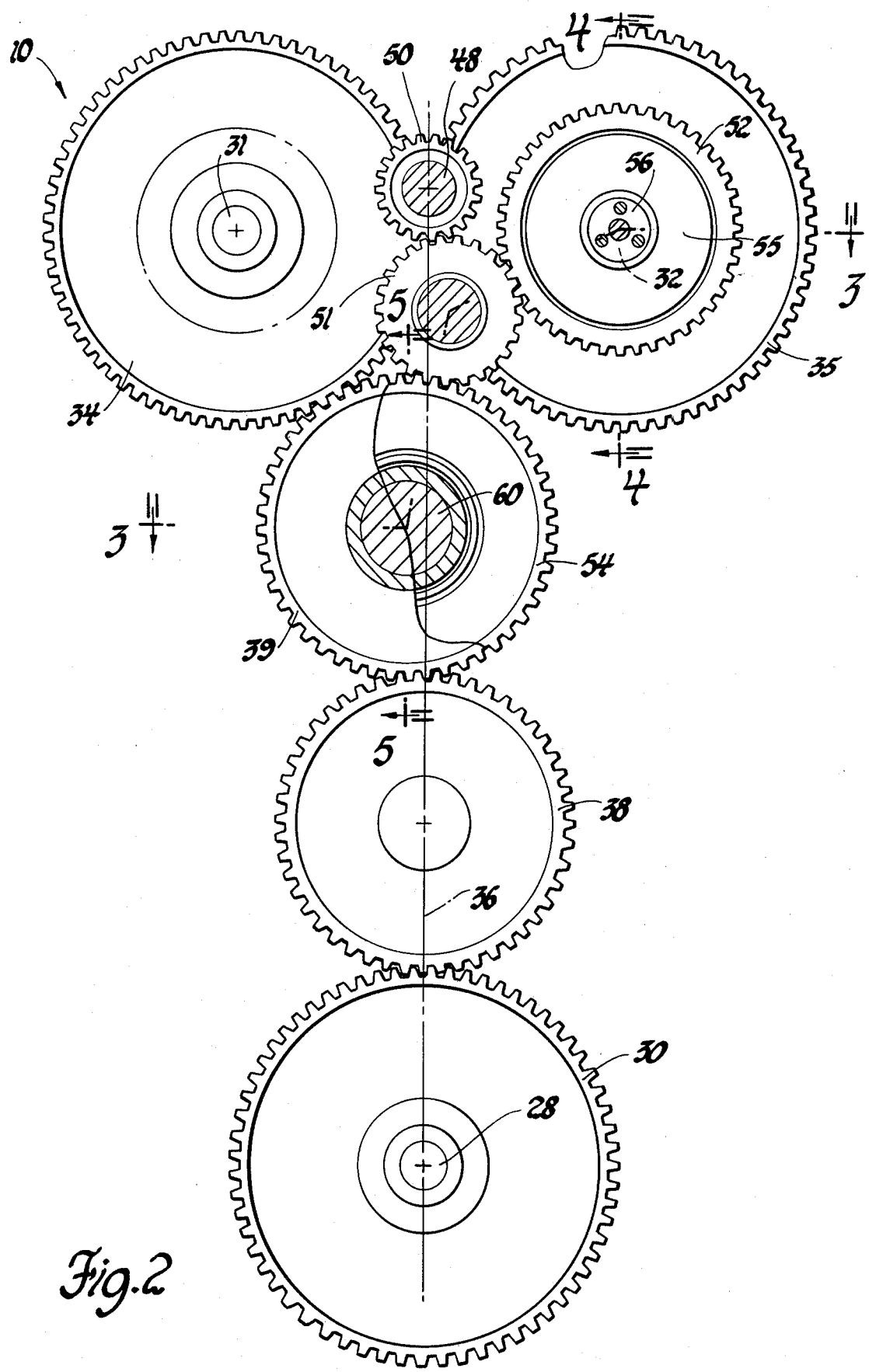
FIG. 2 is a cross-sectional view from the plane of the line 2—2 of FIG. 1 illustrating the engine camshaft gear train and the associated dual ratio turbocharger drive arrangement.
Figure 6:
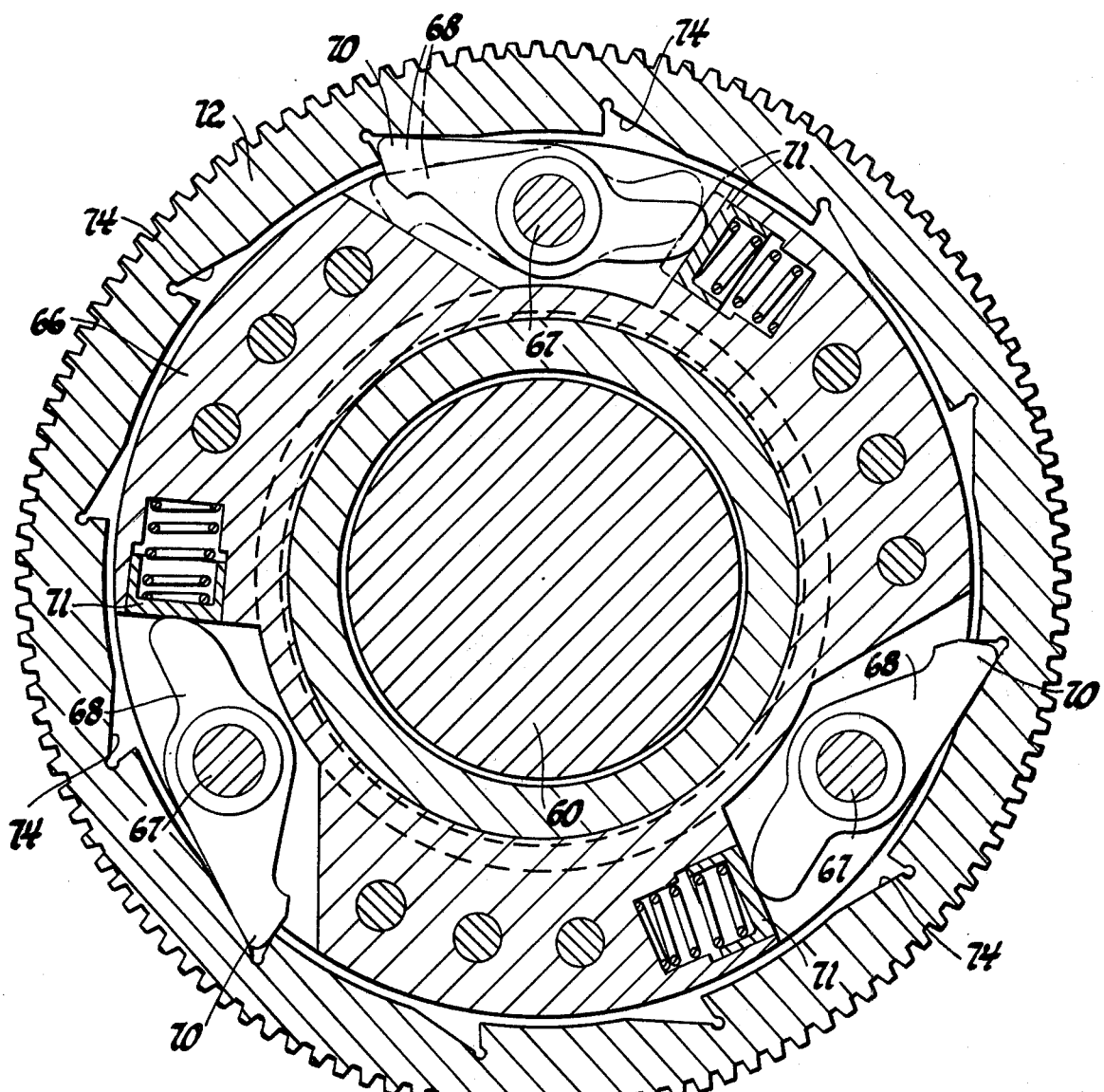
Figure 5:
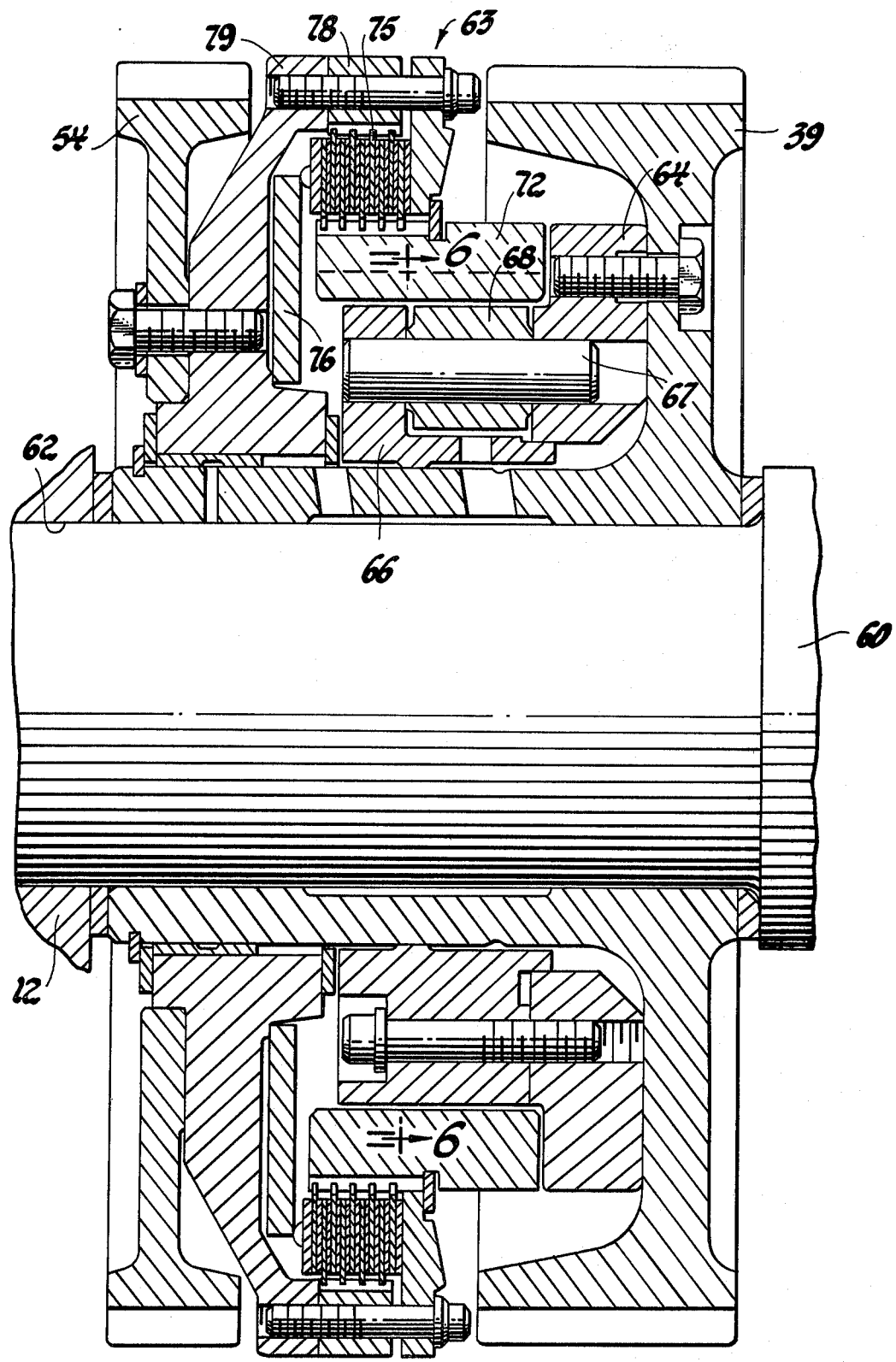

FIG. 5 is a cross-sectional view from the plane of the line 5—5 of FIG. 2 illustrating the composite high speed turbocharger drive gear and its associated speed responsive clutch connected with the second idler gear of the engine camshaft gear train, and FIG. 6 is a cross-sectional view from the plane of the line 6—6 of FIG. 5 illustrating details of the speed responsive clutch for driving the high speed turbocharger drive gear.

DETAILED DESCRIPTION

Referring now to the drawings in detail, numeral 10 generally indicates a turbocharged two stroke cycle medium speed diesel engine having turbo drive means in accordance with the invention. Engine 10 includes a fabricated crankcase, not shown, at one end of which there is mounted an exhaust and gear driven turbocharger generally indicated by numeral 11.

The turbocharger includes a housing 12 supporting a rotor 14 that includes a turbine wheel 15 and a compressor wheel 16 mounted on a common shaft. The turbine wheel 15 is driven by exhaust gases discharged from the engine cylinders, not shown, and directed through an inlet duct and scroll 18 against blades 19 on the turbine wheel, where a portion of the exhaust energy is utilized for turning the rotor. The exhaust gases are then received in a collector chamber 20 and discharged through an exhaust duct 22.

Rotation of the rotor 14 turns the compressor wheel 16 drawing ambient air into an inlet duct 23 where it is compressed by rotating blades 24 on the compressor wheel and discharged through diffuser 26 to an outlet scroll 27 from which it is carried by duct means not shown to the engine cylinders.

The non-illustrated crankcase portion of the engine 10 is conventionally provided with a plurality of pistons reciprocable within associated cylinders. The pistons are connected with the throws of a crankshaft 28 mounted within the crankcase for rotation on a longitudinal axis and supporting on one end a crankshaft gear 30. The engine cylinders are arranged in left and right hand cylinder banks, which are provided with left bank and right bank camshafts 31, 32 respectively rotatable on longitudinal axes for operating the valve gear associated with the cylinders of their respective banks.

The camshafts 31, 32 are rotatable in opposite directions at the same rotational speed as the crankshaft (commonly known as engine speed) by attached left and right bank camshaft gears 34, 35 respectively. Gears 34 and 35 have diameters equal with that of the crankshaft gear 30 and engage one another on the vertical centerline 36 of the engine for oppositely rotatably driving the camshafts.

The camshaft gears 34, 35 are driven from the crankshaft through a pair of idler gears which are appropriately sized with substantially equal diameters somewhat smaller than that of the crankshaft and camshaft gears. The idler gears include a first idler gear 38 engaging and mounted above the crankshaft gear 30 and a second idler gear 39 mounted slightly to the left of the engine centerline 36 and engaging both the first idler gear 38 and the left bank camshaft 34.

As will be apparent, rotation of the crankshaft 28 in a predetermined direction drives the camshafts 34, 35 in opposite rotational directions at a speed equal to the crankshaft speed by virtue of the equal sizes of their respective gears. The idler gears 38, 39 forming part of the drive train are, of course, driven at somewhat higher rotational speeds inversely proportional to the ratios of their diameters with respect to that of the crankshaft gear by which they are driven.

In accordance with the invention, the engine is further provided with a dual ratio mechanical gear drive for maintaining the turbocharger speed at desired minimum ratios with respect to engine speed during engine operation in selected low and high speed portions of the engine speed range under conditions when exhaust energy is insufficient to provide higher turbocharger speeds. Within the turbocharger housing 12, the gear drive train includes a driveshaft 40 attached to the turbocharger rotor 14. Driveshaft 40 is rotatably driven by a speed increasing planetary gear train including a sun gear 42, planet gears 43 and a surrounding ring gear 44.

The ring gear is connected to the turbocharger housing through a one way overrunning (cam and roller) clutch 46 which holds the ring gear stationary when acting as a reaction member for the drive train in driving the rotor. However, clutch 46 allows rotational movement of the ring gear 44 in the forward direction to allow sufficient exhaust energy to increase the turbine speed above the minimum ratio provided by the drive train, thus overrunning the mechanical drive system.

The planet gears 43 are supported on a carrier 47 rotatably mounted within the turbocharger housing and having an outwardly extending stub end 48. A carrier drive gear 50 mounted on stub end 48 is carried externally of the turbocharger housing 11.

Figure 3:
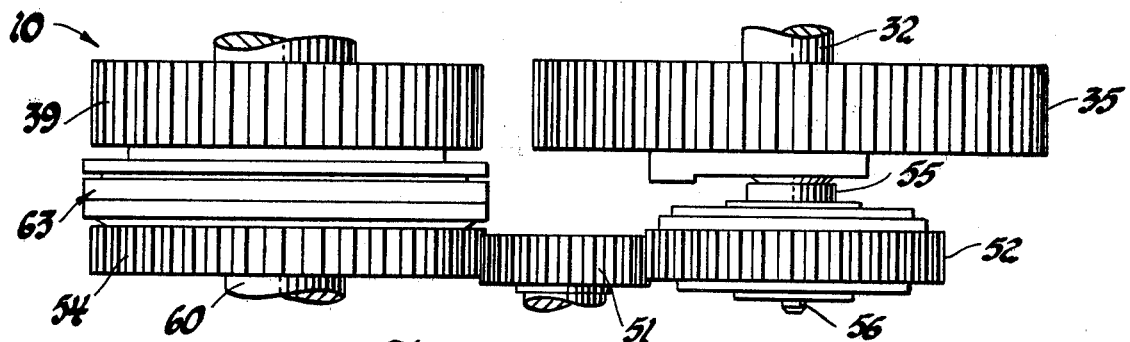
FIG. 3 is a cross-sectional view from the planes indicated by the line 3—3 of FIG. 2 showing portions of the two parallel paths of the dual ratio turbocharger drive gear train.

In accordance with the invention, the carrier drive gear 50 is in turn driven by a turbocharger idler gear 51 carried on the inner end of the turbocharger housing and offset slightly from the vertical engine centerline 36. Turbo idler gear 51, as best shown in FIGS. 2 and 3, is continuously engaged and driveable by two separate drive gears, namely a low speed turbo drive gear 52 and a high speed turbo drive gear 54.

Figure 4:
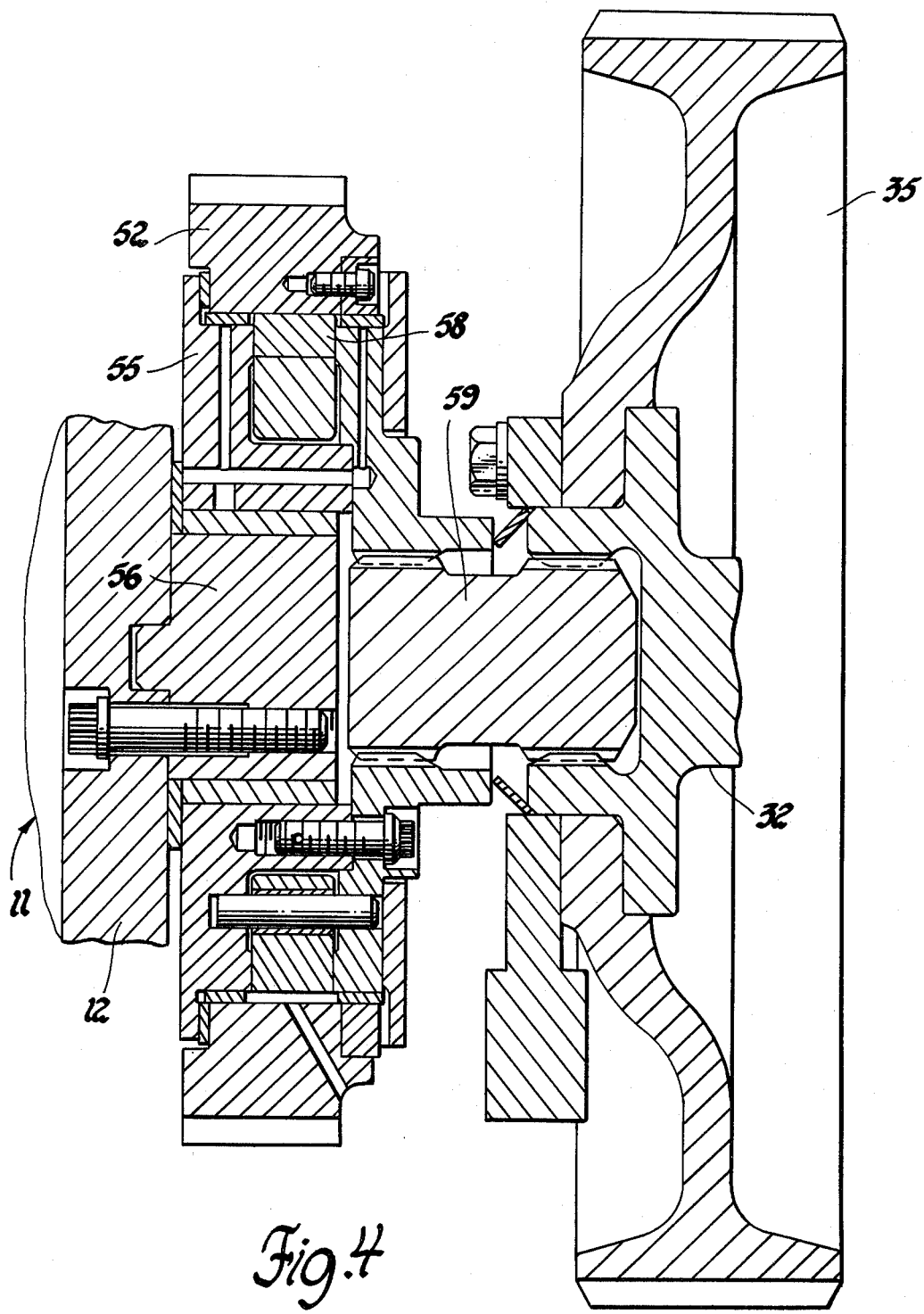
FIG. 4 is a cross-sectional view from the plane of the line 4—4 of FIG. 2 illustrating the low speed turbo drive gear with its associated overrunning clutch and the manner of driving the gear from the left bank camshaft drive gear of the engine.

As best seen in FIG. 4, the low speed turbo drive gear 52 comprises an outer ring rotatably supported on an inner hub 55 which is in turn rotatable on a stub shaft 56 fixedly mounted on an inner wall of the turbocharger housing 11. Between its hub and outer ring, gear 52 includes an overrunning roller clutch 58 which allows the outer ring 52 to be driven by the inner hub 55 in the direction of motion but permits the outer ring to overrun the hub when the gear train is traveling at a faster speed. The inner hub 55 connects through a drive stub 59 with the left bank camshaft gear 35 for the purpose of constantly driving the inner hub of the low speed turbo drive gear 52 at a speed equal to that of the engine camshafts and crankshaft.

As best seen in FIG. 5, the high speed turbo drive gear 54 is carried by the second idler gear 39 which is mounted upon a stub shaft 60 supported by the engine crankcase. Stub shaft 60 is also received within an opening 62 in an inner wall of the turbocharger housing 11 to maintain accurate spacing of the center distance between the gear 54 and the turbocharger carried idler gear 51.

Operatively connected between the second idler gear 39 and the high speed turbo drive gear 54, there is disposed a speed responsive clutch generally indicated by numeral 63. Clutch 63 includes a first carrier ring 64 secured to gear 39 and a second carrier ring 66 secured to the first. Together the carrier rings support, on pins 67, three pivotable flyweights 68 best shown in FIG. 6. Flyweights 68 include pawl ends 70 which are urged inwardly by engagement of the flyweights with spring biased pistons 71 carried by the second carrier ring 66. Surrounding ring 66 is a drive ring 72 that contains inwardly facing ratchet notches 74 adapted to be engaged by the pawl ends 70 of the flyweights when they are driven outwardly by centrifugal force upon rotation of the gears 39, 54 above a predetermined speed.

Outwardly the drive ring 72 is toothed to engage alternate discs of a disc drive pack 75 compressed by a disc spring 76 and engaging a toothed outer drive ring 78 secured to a carrier 79 that is rotatably mounted on the hub of gear 39. The high speed turbo drive gear 54 is in turn attached to hub 79 and is rotatable therewith.

The inertia of the flyweights 68 and the preloading of the spring biased pistons 71 are selected to cause outward pivoting of the pawl ends 70 of the flyweights to engage the notches 74 of the drive ring 72 whenever the engine speed rises above a predetermined lower portion of the engine speed range. The preload of disc spring 76 on the disc drive pack 75 is selected to provide a limited amount of slipping between the clutch drive rings 72 and 78 when the flyweights engage the notched ring 72 to reduce the shock load of clutch engagement on the turbocharger drive train and permit smoother acceleration of the train to the higher operating speed.

In operation when the engine is started and operating at idle or in the predetermined lower portion of the speed range, the flyweights 68 will have their pawl ends 70 biased inwardly by the spring pistons thus maintaining clutch 63 disengaged and disconnecting high speed gear 54 from the associated second idler gear 39 of the engine gear train. Accordingly, the turbocharger will be driven at the predetermined lower speed ratio by the engine gear train acting through right bank camshaft gear 35, overrunning clutch 58 and the low speed gear 52 driving idler 51 and carrier drive gear 50 with the remainder of the turbocharger gear train.

If the engine speed is increased above the lower portion of the speed range, the increased rotational speed of the second idler gear 39 will cause the pawl ends 70 of the flyweights 68 to be forced outwardly, engaging the ratchet notches 74 of the drive ring 72 and causing, after a limited amount of slip, the high speed turbo drive gear 54 to be driven by and at the same speed as the second idler gear 39. This will increase the rotational speed of the turbocharger gear train to the predetermined higher speed ratio required to provide adequate charging air for the engine at the higher operating speeds above the lower portion of the speed range. Since the low speed gear 52 remains engaged with idler 51, its speed will also increase as permitted by the overrunning clutch 58.

At any time during engine operation when the energy of the exhaust gases acting on the blades 19 of the turbine wheel 15 is sufficient, the exhaust gases may drive the turbocharger at a speed higher than that provided by the supplemental dual speed gear train. In such a case the overrunning clutch 46, which grounds ring gear 44 to the turbocharger housing, will allow rotation of the ring gear at the higher speed to allow the exhaust energy to drive the turbocharger faster and supply additional charging air to the engine.

As illustrated by the previously described embodiment, the present invention provides a dual speed ratio mechanical drive system for an overrunning type exhaust driven turbocharger. The system is especially adapted for two stroke cycle diesel engines, although usable otherwise, and provides improved operating efficiency by allowing the turbocharger to be operated at a lower mechanically driven speed ratio when the engine is in the lower portion of its operating speed range where the need for charging air is reduced as compared to that required during operation above the lower speed range. In addition a specific arrangement for providing the dual speed ratio turbocharger drive in conjunction with a previously established gear train arrangement has been provided.

While the invention has been described by reference to a specific embodiment chosen for purposes of illustration, it should be understood that numerous changes could be made without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows.

1. In combination, an internal combustion engine having a turbocharger,
    supplemental primary mechanical drive means in the engine for maintaining a minimum primary operating speed ratio of the turbocharger relative to engine speed when exhaust energy is insufficient to provide a higher turbocharger speed, said primary speed ratio providing charging air adequate for engine operation throughout its speed range, and the improvements comprising
    secondary mechanical drive means in the engine for maintaining a minimum secondary operating speed ratio of the turbocharger relative to engine speed lower than the primary speed ratio and requiring reduced energy but capable of providing sufficient charging air for engine operation in a lower portion of its operating speed range, and
    speed responsive means in the primary drive means and operative to maintain driving operation of the primary drive means at engine speeds above said lower portion of the engine speed range and to disengage the primary drive means to allow lower speed driving of the turbocharger by the secondary drive means during engine operation within said lower portions of its operating speed range,
    whereby an energy efficient two speed supplemental turbocharger drive system is provided.

2. In an internal combustion engine, the combination comprising an exhaust driven turbocharger connected to supply charging air to the engine,
    a supplemental drive system interconnecting the engine and turbocharger including primary drive means operative when engaged to drive the turbocharger at a primary speed ratio relative to engine speed when exhaust energy is insufficient to maintain a higher turbocharger speed, said primary speed ratio being adequate to provide sufficient air for engine operation at all speeds,
    overrunning means in the drive system operative to permit exhaust driven operation of the turbocharger at speeds above that provided by the supplemental drive system when adequate exhaust energy is available, and the improvement comprising
    secondary drive means in the drive system operative to drive the turbocharger at a secondary speed ratio relative to engine speed when exhaust energy is insufficient to maintain a higher turbocharger speed, said secondary speed ratio being lower than said primary speed ratio but adequate to provide sufficient air for engine operation in a lower portion of the engine speed range with a reduction of drive energy from that required for operation at the primary speed ratio,
    overrunning means in said secondary drive means and operative to permit operation of the drive system at the primary speed ratio when the primary drive means is engaged, and
    speed responsive engaging means in the primary drive means and operative to disengage the primary drive means when the engine speed remains within said lower portion of the engine speed range and to engage said primary drive means when the engine speed rises above said lower portion of the engine speed range,
    whereby, during conditions of insufficient exhaust gas energy for higher speed operation, the turbocharger is driven at the higher primary speed ratio at engine speeds above said lower portion of the engine speed range and at the reduced energy lower secondary speed ratio at engine speeds within said engine speed range lower portion.

3. In an internal combustion engine, the combination comprising an exhaust driven turbocharger connected to supply charging air to the engine,
    a supplemental mechanical drive system interconnecting the engine and turbocharger including primary drive means operative when engaged to drive the turbocharger at a primary speed ratio relative to engine speed when exhaust energy is insufficient to maintain a higher turbocharger speed, said primary speed ratio being adequate to provide sufficient air for engine operation at all speeds, an overrunning clutch in the drive system operative to permit exhaust driven operation of the turbocharger at speeds above that provided by the mechanical drive system when adequate exhaust energy is available, and the improvement comprising secondary drive means in the drive system operative when exhaust energy is otherwise insufficient to drive the turbocharger at a secondary speed ratio relative to engine speed lower than said primary speed ratio but adequate to provide sufficient air for engine operation in a lower portion of the engine speed range with a reduction of drive energy from that required for operation at the primary speed ratio, an overrunning clutch in said secondary drive means and operative to permit operation of the drive system at the primary speed ratio when the primary drive means is engaged, and a speed responsive clutch in the primary drive means and operative to disengage the primary drive means when the engine speed remains within said lower portion of the engine speed range and to engage said primary drive means when the engine speed rises above said lower portion of the engine speed range, whereby during conditions of insufficient exhaust gas energy for higher speed operation, the turbocharger is driven at the higher primary speed ratio at engine speeds above said lower portion of the engine speed range and at the reduced energy lower secondary speed ratio at engine speeds within said speed range lower portion.

4. In an internal combustion engine, the combination comprising a crankshaft and a camshaft mounted for rotation on spaced parallel axes, an exhaust driven turbocharger connected to supply charging air to the engine when in operation and a mechanical drive system interconnecting the engine crankshaft and the turbocharger to drive the turbocharger at predetermined minimum drive ratios with respect to engine speed when exhaust energy is inadequate to maintain the turbocharger speed above said drive ratios, said drive system including a crankshaft gear carried by the crankshaft an idler gear operatively connected with and driven by the crankshaft gear, a camshaft gear drivingly connected with the camshaft and operatively connected with and driven by the idler gear to drive the camshaft at a fixed speed ratio relative to the crankshaft, a primary turbo drive gear rotatably mounted for rotation in substantially coaxial spaced relation with said idler gear, speed responsive clutch means between said idler and primary turbo drive gears and operative to drivingly interconnect said gears above a predetermined rotational speed of the crankshaft and to otherwise disconnect said gears, a secondary turbo drive gear rotatably mounted in substantially coaxial spaced relation with said camshaft gear, overrunning clutch means between said camshaft and secondary turbo drive gears and operative to drive said secondary turbo drive gear from said camshaft gear or permit overrunning of the secondary turbo drive gear above the speed of the camshaft gear, turbo drive means connected to drive said turbocharger and operatively connected with both said primary and secondary turbo drive gears to be selectively driven thereby as determined by the conditions of crankshaft rotational speed and available exhaust energy supplied to the turbocharger.

* * * * *